United States Patent [19]

Geyer

[11] Patent Number: 4,859,069

[45] Date of Patent: Aug. 22, 1989

[54] EXTRUSION APPARATUS

[76] Inventor: Paul Geyer, 15660 Tacoma, Detroit, Mich. 48025

[21] Appl. No.: 193,007

[22] Filed: May 12, 1988

[51] Int. Cl.[4] ............................................. B29B 1/06
[52] U.S. Cl. ..................................... 366/77; 366/88; 366/89
[58] Field of Search ....................... 366/75, 79, 78, 77, 366/76, 80, 81, 88, 89, 90, 318, 319, 322, 323, 324; 425/207, 208, 209, 200, 205

[56] References Cited

U.S. PATENT DOCUMENTS

| 4,227,870 | 10/1980 | Kim | 366/79 |
| 4,289,410 | 9/1981 | Anders | 366/79 |
| 4,303,344 | 12/1981 | Muller | 366/77 |

Primary Examiner—Robert W. Jenkins
Attorney, Agent, or Firm—Dykema Gossett

[57] ABSTRACT

The apparatus is for the straining and processing of plastic and rubber like materials and has a rotor rotatably mounted in the bore of a cylindrical barrel and operable to move process material, from one end of the bore to the other, to progressively heat, develop pressure, transport and separate the fine and fluent from the oversize and less fluent process material and to discharge the separated materials from different ports. Means, structurally integral with the rotor and barrel bore, are provided for various functions for operably developing heat, pressure and transporting said process material with minimum twining of the process material flow lines; for continuously leading off the fine and fluent process material, from each side of multiple circumferential rotor extrusion grooves into restrictive actuated circumferential openings, as formed between the barrel bore and tooth tops of the circumferential rotor extrusion grooves, longitudinally from the openings, along the tooth tops to a centrally located tooth top extrusion groove, which intercepts all of the fine and fluent process material and conveys it to ports communicating, from the tooth top extruder groove to the internal bore of said rotor; for leading off the fine and fluent process material as entered into the bore of the rotor, a stationary helical groove rotor, which due to relative rotational movement, rotor to rotor, extrudes the fine and fluent process material out of the end of the rotor and the extruder, in a smooth and even flow pattern.

7 Claims, 4 Drawing Sheets

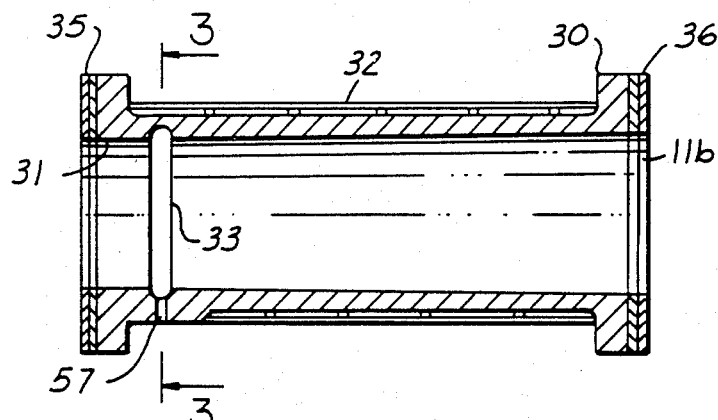
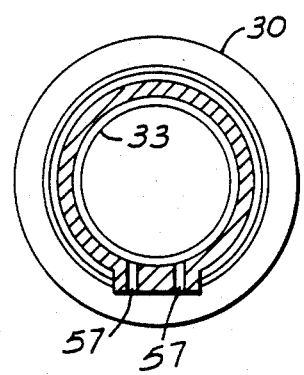
FIG.2  FIG.3
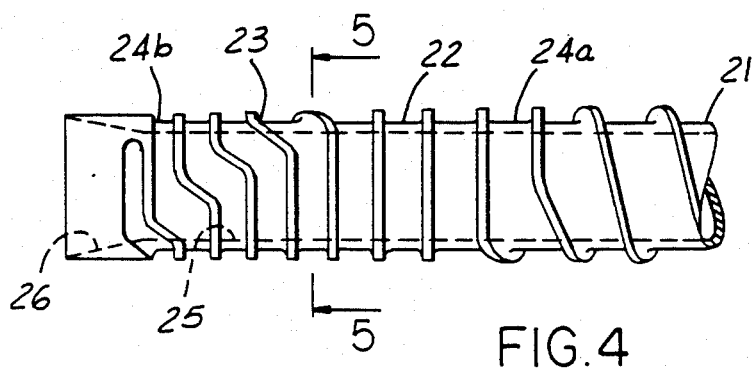
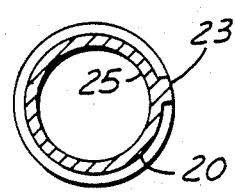
FIG.4  FIG.5
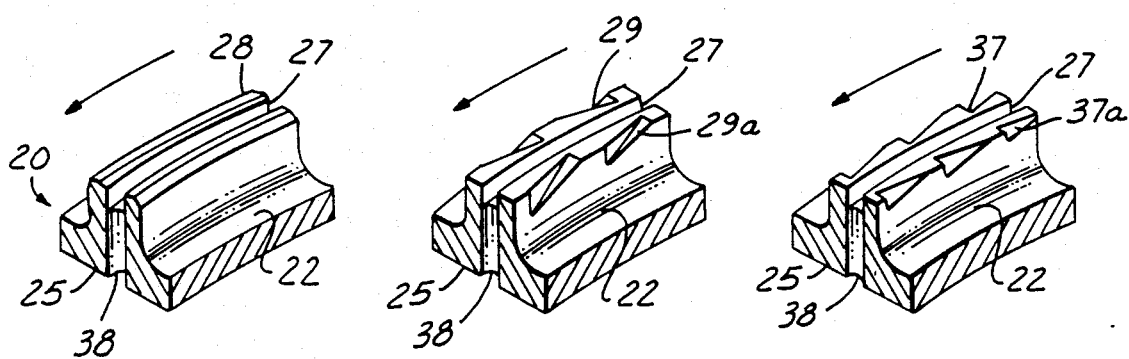
FIG.6  FIG.7  FIG.8

EXTRUSION APPARATUS

FIELD OF THE INVENTION

This invention relates to an extrusion apparatus, and more particularly to an apparatus of the rotor and barrel type for refining, straining and reclaiming of thermoplastic and rubber like materials.

BACKGROUND OF THE INVENTION

The rubber industry has and is using screen type straining devices to separate oversize material from compounds as used in the manufacture of inner tubes, etc. The restrictive holes of the screens progressively become plugged, with oversize material, causing uneven extrusion pressure and the resulting uneven processing.

The plastic industry also used screens, but has advanced to the stage where continuous screen changing devices are used to improve uniformity.

SUMMARY OF THE INVENTION

It is therefore a feature of the present invention to provide an improved apparatus for the separation of the fine and fluent material from the oversize and less fluent material by providing, sharp edged entrances to activated circumferential longitudinal passages, the entrance and width of which is restrictive to the oversize and less fluent material.

Another feature is to provide an improved apparatus which intensively shears all the process material at a shear ratio, well in excess of present day practice, which can be expected to improve micro-dispersion in a manner which produces a superior product.

Still another feature is to provide an improved apparatus which will separate the fine and fluent from the oversize and less fluent process material and direct the separated material to separate discharge ports.

A further feature is to provide an overflow device, which can be set at various rates of discharge to lead off the oversize material, as passed by the straining device, direct it to separate discharge ports, without appreciably depleting upstream extrusion pressure.

A still further feature is to provide an apparatus which has the rotor edges of the entrances to the activated circumferential longitudinal passages provided with serrations in a longitudinal direction, arranged to "plow" oversize material from the openings.

Another feature is to provide an apparatus which has the rotor edges of the entrance to the activated circumferential longitudinal passages beveled in a manner which accepts the large agglomerates and "refines" them to an acceptable size.

Still another feature is to provide an apparatus which has the rotor edges of the entrances to the activated circumferential longitudinal passages provided with serrations in a radial direction, arranged to "crush" friable process material.

Still another feature is to provide an apparatus with circumferential extrusion grooves which by inherent design, concentrate and the extrusion shearing on the process material at the outer portion rotor, from where it is led off equally in a longitudinal direction, both upstream and downstream, and thereby exposing less worked process material to additional extrusion shearing.

A further feature is to provide an apparatus with circumferential extrusion grooves, which by inherent design provide fast forward flow of the fluent phase process material and thereby minimizing the rework of already worked process material.

Another feature is to provide a straining section with rotor and barrel members tapered in the longitudinal direction so that relative longitudinal movement rotor to barrel adjusts the thickness of the restrictive circumferential openings as formed by the clearance rotor outside diameter to barrel bore.

Still another feature is to provide an improved apparatus which has cooling passages in rotor and barrel members adequate for the circulation of temperature control fluids.

A still further feature is to provide an apparatus which extrudes the process material from stationary extruder grooves, in a manner which eliminates the plusing of process material as caused by rotating screw end flights.

Still another feature is to provide an improved apparatus for the reclaiming of vulcanized rubber like material, which, in addition to heating, pressurizing and straining of the process material, also has a cooling section which cools the process material before exposure to atmosphere.

Finally, another feature is to provide an entrance port in the barrel member through which liquid chemicals can be introduced to the process material for softening or devulcanizing the polymer.

BRIEF DESCRIPTION OF THE DRAWINGS

FIG. 2, is a sectional elevational view of the staining barrel section.

FIG. 3, is a cross-sectional view taken on the line 3—3 of FIG. 2.

FIG. 4, is an elevational view of the rotor of the straining barrel section.

FIG. 5, is a cross-sectional view taken on the line 5—5 of FIG. 4.

FIGS. 6, 7 and 8 are isometrical views of the circumferential tooth tops of the rotor of the straining barrel section.

DESCRIPTION OF THE PREFERRED EMBODIMENT

Introduction

Figure 1:
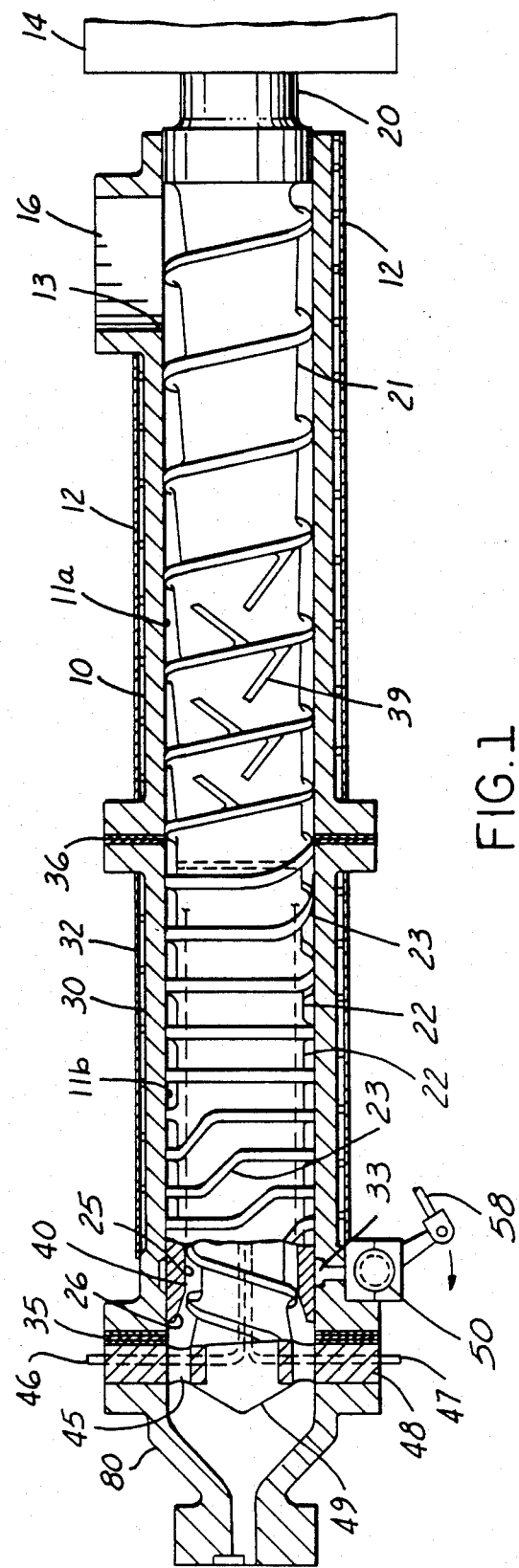
FIG. 1, is a sectional elevational view of the extrusion apparatus in accordance with the present invention and is the preferred embodiment as applied to the straining process material while extruding it into the desired product.

As an introduction to the present invention, there is provided a new or improved extrusion apparatus of the rotor and barrel type, having a feed means, a rotor and barrel extrusion section arranged to deaerate, develop heat and pressure, and downstream movement of the process material with minimum twining, (elongation and twisting of material flow lines) to the straining section. The straining section rotor is provided with circumferential extrusion grooves, made continuous by means of abrupt diagonal interconnecting passages. The straining action is accomplished by restrictive actuated circumferential openings and passages as formed by the clearance of the rotor ridge or tooth top to the smooth bore of the barrel. The fine and fluent process material enters the opening and passage, flows longitudinally, both upstream and downstream, half way across the tooth top to a tooth top circumferential extrusion groove which intercepts all of the strained fine and fluent process material.

Due to the circumferential grove design, upstream and downstream process material flow at the tooth top is basically the same, a condition difficult to obtain with helical groove tooth tops. From the tooth top circumferential extruder groove, ports in a radial direction lead the fine and fluent process material to a concentric internal rotor bore, which is fitted with a stationary extruder screw which reacts to extrude the process material, as received from the radial ports, from the end of the extruder completely free from the "blips" or pulsing inherent with the end of a rotating extruder screw. The less fluent and oversize material, rejected by the restrictive openings, is passed to the downstream end of the rotor circumferential groove channel, where a circumferential barrel groove is provided to collect the oversize and less fluent process material and direct it to separate barrel discharge ports which lead to an overflow metering device, which can be set at a preset rate or hand operated, and which discharges the oversize and less fluent process material to atmosphere without undue loss of extrusion pressure in the straining section.

Reclaiming vulcanized rubber like process material is also an extrusion straining operation, which the high temperature required to soften the polymer. To adapt the straining apparatus for reclaiming, the pressure generating section is arranged to develop the required heat and pressure, a barrel port is provided for the introduction of devulcanizing chemicals and most of all a cooling section is interposed between the straining section and the discharge end of the extruder, in a manner which minimizes oxidation of the polymer, and the tendency to actually catch on fire.

Description of Extrusion Apparatus

Referring now to the drawings, like reference numbers and letters donate the corresponding part throughout several views of the extrusion apparatus "A".

The apparatus "A" construed in accordance with the invention is the preferred embodiment as applied to the continuous straining or refining of process material, as the end product is being procuded. The extrusion apparatus "A" has a barrel or forcing barrel section 10 procided with chanfered barrel entrance 13 and with a bore 11a which extends therethrough and which acts in conjunction with rotor 20, rotatably mounted therein and adapted for rotation by drive means 14. A conventional water jacket 12 is provided around the barrel 10. The apparatus "A" is provided with a hopper opening 16, through which the material to be processed is entered into the apparatus.

The rotor 20 is provided with an essentially helical extrusion groove 21 fitted with diagonal barriers 39 which co-act with the barrel bore 11a to heat, pressurize and transport in a downstream direction, with minimum twinging of the material flow lines to the straining barrel section 30.

The rotor grooves or helical extrusion grooves 21, at the straining barrel section 30 are changed into circumferential grooves 22, which feature the fast forward flow of the fluent phase process material at the outer portion of circumferential groves 22 as compared to the less fluent deeper process material. The circumferential grooves 22 are abruptly interconnected by means of passages 23 so as to form a continuous path around and along rotor 20.

Each of the tooth tops, forming the circumferential grooves 22, is provided with a centrally located extrusion groove which has numerous ports extending radially inward to the bore 25 of rotor 20. The tooth tops of grooves 22 co-act with the smooth bore 11b of strainer barrel section or barrel 39 to form circumferential longitudinal activated channels, measured in thickness by the clearance rotor outside diameter to the barrel bore. Process material is formed by extrusion pressure longitudinally, in both upstream and downstream directions from the circumferential grooves 22 along the clearance, rotor outside diameter to barrel bore 11b, to the tooth top extrusion groove from where it is directed radially inward to the bore 25 of rotor 20.

As this design is dependent on the clearance rotor to barrel bore for both the refining and reclaiming of processing material, an exact clearance dimension is required. To make this dimension adjustable, to suit process material, both rotor and co-acting barrel are tapered in diameter, so that, longitudinal movement of the barrel in relation to the rotor adjusts the clearance, rotor to barrel bore. The clearance adjustment is made by moving the barrel by means of shims 35 and 36 or by moving the rotor 20 endwise. To provide adequate pressure throughout the straining section, the circumferential extrusion grooves 22 are tapered in extrusion capacity longitudinally, maximum at the lead end and zero at the trailing end. Material, selected by the tooth top clearance, arrives at the bore 25 of rotor 20 and is extruded downstream by means of the stationary screw like rotor 40, mounted in the bore 25 of rotor 20, to the rotor support plate 48, through the plate openings 45 and on to the extrusion port or extrusion head 80, thereby completing the extrusion of the fine and fluent process material. The oversize and less fluent process material, rejected by the restrictive circumferential openings, proceeds to the end of the rotor strainer groove 22, transfers to a circumferential barrel groove which has openings leading to the discharge metering device 50 to 59 of Figures 14 and 15.

FIG. 2 illustrates the straining barrel section 30. It features a smooth tapered bore 11b to 31. Shims 35 and 36 are added or subtracted to shift the barrel endwise and to thereby adjust the clearance rotor outside diameter to barrel bore. The circumferential groove 33, at the downstream end of the barrel, accumulates the oversize and less fluent process material, rejected by the activated circumferential passages, and directs it to outlet ports 34. The outside of the barrel section 30 is fitted with a water jacket 32 for temperature control of the straining section. FIG. 3 shows the circumferential groove 33 and the location of the outlet ports 57.

FIG. 4 illustrates the rotor 20 of the straining section and the change of the helical grooves 21 to circumferential grooves 22, which may vary in depth circumferentially, deep at the leading end and shallow at the trailing end so as to effect a tightening spiral on the process material. The abrupt groove transfer 23, interconnects the grooves 22 to form a continuous path around and along the rotor 20. The reduction in extrusion capacity 24a to 24b is shown as a reduction in width and depth of the circumferential grooves. The bore 25 of rotor 20 is cylindrical, smooth and uniform, and extends the length of the straining section. The bore 25 at the downstream end features a bevel 26, which is the end of rotor 20. The rotor bore 25 and an abrupt transfer tooth 23 are shown in FIG. 5.

FIG. 6 illustrates the outside or tooth top circumferential rotor groove 27 provided in rotor 20 having the bore 25. The rotor groove 27, which has both upstream and downstream edges 28 is beveled in a manner which "refines" less fluent agglomerates to acceptable size. The tooth top circumferential rotor groove 27 is connected to the bore 25 of rotor 20 by a plurality of circumferentially spaced ports 38. In FIG. 7 the outside diameter or tooth top of circumferential rotor groove 27 has both upstream and downstream edges 29 arranged to form inclined planes 29a, starting deep and ending at zero depth in a manner arranged to "crush" friable process material to acceptable size.

In FIG. 8 the outside diameter or tooth top of the circumferential rotor groove 27 has both upstream and downstream edges 37 arranges to form longitudinal "plows" 37a, staring wide and narrowing to zero in a manner that removes oversize material from the circumferential groove 27.

Figure 9:
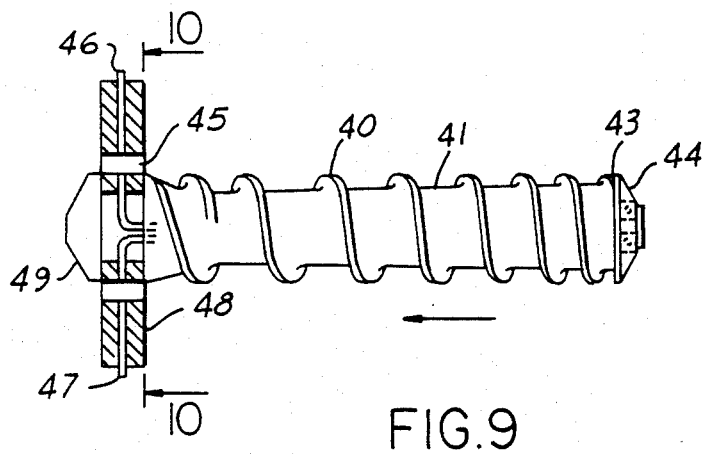
FIG. 9, is an elevational view of the stationary screw type device as installed inside the rotor of the straining barrel section.
Figure 10:
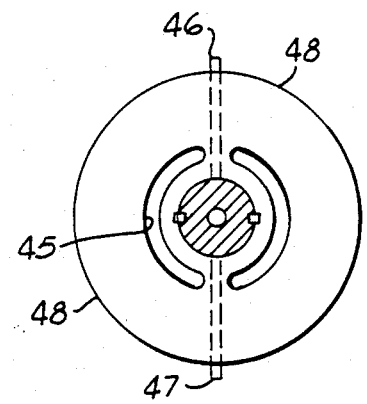
FIG. 10, is a sectional view taken on the line 10—10 of FIG. 9 and FIG. 11 showing outlet openings for the process material and the arrangement of water cooling channels in FIG. 9.

The stationary rotor 40 of FIG. 9 and FIG. 10 as installed in bore 25 of rotor 20, has a mounting or end plate 48. Relative rotational movement of the rotor 40 to bore 25 of rotor 20 moves the strained process material out of bore 25 to the mounting plate 48, through the plate opening 45 to the process forming equipment 80. The rotor 40 is equiped with a helical extruder groove 41, which starts at a low estrusion rate and increases progressively downstream. The upstream end of rotor 40 is provided with a rotating plate barrier 43, attached to rotor 40 by means of thrust bearing 44, in a manner which prevents the upstream flow of process material. The mounting plate 48 is provided with a water inlet 46 and a water outlet 47 which connect to and route water through the core of rotor 40. The end nose cone 49 securely attaches rotor 40 to end plate 48.

Figure 11:
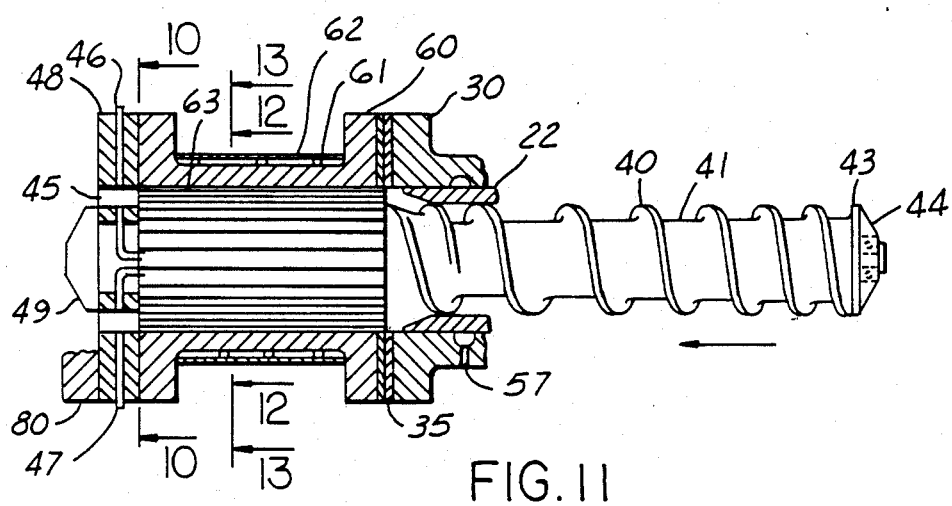
FIG. 11, is a modification of the extrusion apparatus of FIG. 1 and has a process material cooling section inserted between the straining barrel section and the discharge port, and is the preferred embodiment as applied to the reclaiming of vulcanized rubber like process materials.
Figure 12:
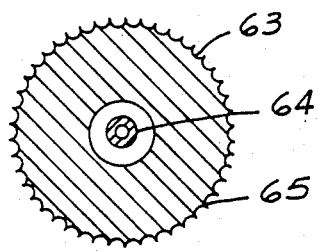
FIGS. 12 and 13 are cross-sectional views taken respectively on the lines 12—12 and 13—13 of FIG. 11 showing the arrangement of the reclaimed material cooling passage.
Figure 13:
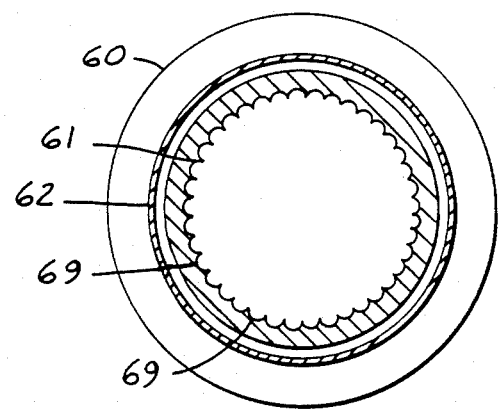

FIGS. 11-13 is a modification of FIG. 1 and is specially adapted for the reclaim of vulcanized rubber like process material. As a high temperature is required to fluidize or reclaim the material, the tendency to oxidize or burn requires cooling the material, before exposure to atmosphere. Therefore, the cooling section barrel 60 is interposed between the straining section barrel 30 and the process forming equipment 80. The cooling section barrel 60 is provided with a bore 61 provided with longitudinal grooves 69 to increase its cooling surface. The barrel outside diameter is encased with a water jacket 62 for temperature control. The rotor 40, as extended through the cooling section, has a rotor extension 63 also provided with longitudinal cooling grooves 65 to increase its cooling surface. Other items of the modified rotor are the same as shown in FIG. 9.

FIG. 12 shows the grooved rotor extension 63, rotor cooling pipe 64 and the longitudinal cooling grooves 65 for the good processed rubber. The corresponding longitudinal grooves 69 of the bore 61 of the cooling section barrel 60 are shown in FIG. 13.

Figure 14:
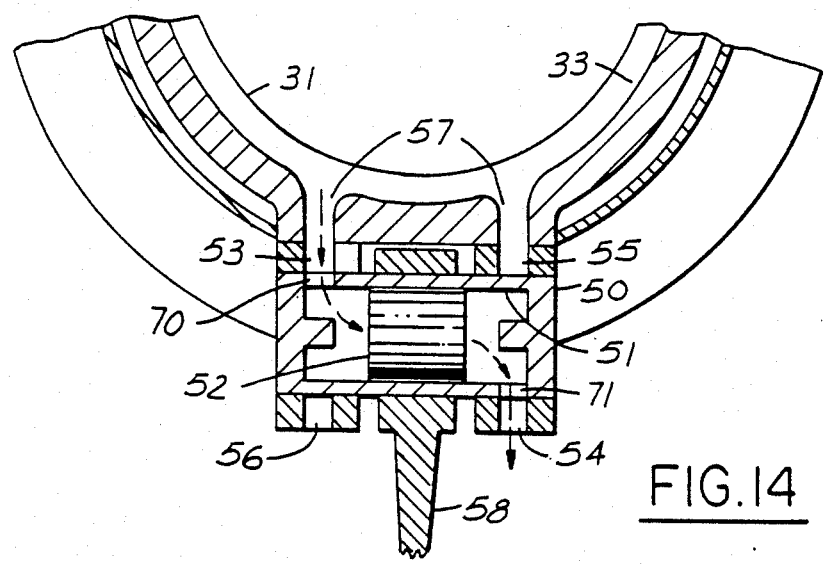
FIG. 14 is is a cross-sectional elevational view of the overflow metering device arranged to discharge the oversize and less fluent process material from separate auxiliary ports with undue loss of extrusion pressure.
Figure 15:
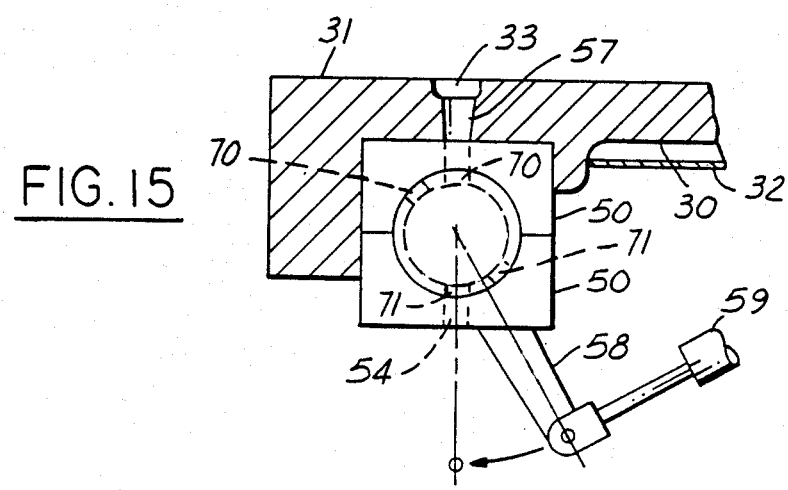
FIG. 15 is an elevational end view of the overflow metering device of FIG. 14 and illustrating the drive means for indexing the metering cylinder.

The Dross overflow metering device of FIGS. 14 and 15 illustrates the barrel accumulation groove 33 communicating with outlet ports 57 which lead to barrel entrance ports 53 and 55. The cylinder 50 is provided with a pair of entrance openings 70 and a pair of exit openings 71. When an entrance opening 70 to the metering cylinder 50 is aligned with barrel entrance port 53 or 55, oversize process material enters cylinder bore 51 and forces the free moving piston 52 to the remote position and thereby forcing a measured amount of previously entered process material from cylinder exit opening 71 via exit ports 54 and 56.

The cylinder 50 of the overflow metering device is rotatable in order to align the entrance holes 70, 71 of cylinder 50 alternately with an entrance port 53 or 55 so as to shuttle the free moving piston 52 back and forth and to thereby exit a measured amount of process material from discharge ports 54 or 56 at each index position. A lever arm 58 is connected to the metering cylinder 50 and is activated by the drive means 59. With such a construction, the bad material such an oversize wire, tramp metal, etc. is removed without the apparatus loosing pressure.

Figure 16:
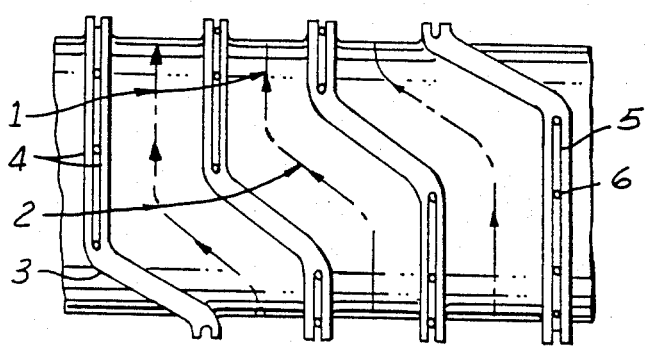
FIG. 16 is an elevational view of the straining and reclaiming section of the rotor.

Referring now to FIG. 16, the straining and reclaiming extrusion process as described previously includes certain steps or features represented by numerals 1-8 inclusive. These steps and features are as follows:
1. Mainstream extrusion flow circumferential with abrupt transfers.
2. Mainstream extrusion flow circumferential with abrupt transfers.
3. Normal extrusion clearance at abrupt transfers.
4. Restrictive tooth top clearance length is approximately two circumferences in length per flight.
5. Tooth top circumferential groove.
6. Tooth top radial ports.
7. Concentric rotor end bore with take-away screw.
8. Dross overflow device (FIGS. 14 and 15).

What I claim is:
1. An apparatus for the straining and processing of plastic and rubber like materials, said apparatus having a rotor rotatably mounted in the bore of a cylindrical barrel and operable to move process material, from one end of said bore to the other, to progressively heat, develop pressure, transport and separate the fine and fluent from the oversize and less fluent process material and to discharge the separated material from different ports:

first means, structurally integral with said rotor and barrel bore, for operably developing heat, pressure and transporting said process material with minimum twining of the process material flow lines;

second means, structurally integral with said rotor and barrel bore, for continuously leading off the fine and fluent process material, from each side of multiple circumferential rotor extrusion grooves into restrictive actuated circumferential openings, as formed between the said barrel bore and tooth tops of the circumferential rotor extrusion grooves, longitudinally from the openings, along the tooth tops to a centrally located tooth top extrusion groove, which intercepts all of the fine and fluent process material and conveys it to ports communicating, from the tooth top extruder groove to the internal bore of said rotor;

third means, structurally integral with said rotor, for leading off the fine and fluent process material as entered into the bore of said rotor, a stationary helical groove rotor, which due to relative rotational movement, rotor to rotor, extrudes the fine and fluent process material out of the end of the rotor and the extruder, in a smooth and even flow pattern, not subject to the "blips" as caused by the end flights of a rotating extruder screw;

fourth means, structurally integral with said rotor and barrel, continuous, abruptly interconnected circumferential rotor extrusion grooves, which transport the oversize and less fluent process material, rejected by the circumferential restrictive openings, to the downstream end of the straining section, where the material is transferred to a barrel circumferential groove which communicates with ports; and fifth means, structurally integral with said barrel, and communicating with said last mentioned ports, a metering device arranged to exit the oversize and less fluent process material at a preset rate to atmosphere, without releasing upstream extrusion pressure.

2. Apparatus as defined in claim 1, wherein the helical rotor groove, at the hopper end, is fitted with extra wide tooth tops so as to co-act with a smooth barrel bore to form a spiral passage along the tooth tops, from the downstream high pressure area back to the hopper opening, for entrained air to bleed back to the hopper.

3. Apparatus as defined in claim 1, wherein a portion of the rotor helical groove is fitted with diagonal barriers staring alternately from the leading and trailing edges, extending part way across said rotor helical groove, having increased clearance barrier top to barrel bore and arranged to allow the fast forward flow of the fluent process material over the barrier, while the less fluent process material is directed back and forth across the extrusion groove, tending to wind and unwind the stress lines of the process material, this compares to the usual helical groove which effects an ever tightening spiral on the stress of the process material, and thereby the barrier type extruder groove delivers a lower stress oriented process material to the straining section.

4. Apparatus as defined in claim 1, wherein the diameter of the straining section rotor and barrel is tapered in a longitudinal direction so that endwise movement of the barrel to the rotor or rotor to barrel changes the width of the restrictive, actuated, circumferential openings to thereby control the fineness of the straining operation.

5. Apparatus as defined in claim 1, wherein the outside diameter of the tooth tops of the teeth forming the circumferential rotor extrusion grooves, has its edges, both upstream and downstream, beveled so as to increase the width of the circumferential entrances in a manner which tends to refine or reduce the size of agglomerates to fine or fluent process material.

6. Apparatus as defined in claim 1, wherein the outside diameter of the tooth tops of the teeth forming the circumferential rotor extrusion grooves have edges, both upstream and downstream, undercut to form inclined plane surfaces, acting in a radial direction to the co-acting barrel bore in a manner which tends to crush friable process material to acceptable fine or fluent process material.

7. Apparatus as defined in claim 1, wherein the outside diameter of the tooth tops of the teeth forming the circumferential rotor extrusion grooves have edges, both upstream and downstream, undercut in a radial and longitudinal directions to form a tooth top profile which tends to plow foreign material longitudinally from the restrictive strainings openings.

* * * * *